March 15, 1955  H. O. JENSEN  2,704,345

VARIABLE-SPEED ALTERNATING-CURRENT MOTOR SYSTEM

Filed Feb. 16, 1952

INVENTOR.
HELMAR O. JENSEN
BY Laurence B. Dodds
ATTORNEY

United States Patent Office 2,704,345
Patented Mar. 15, 1955

2,704,345

VARIABLE-SPEED ALTERNATING-CURRENT MOTOR SYSTEM

Helmar O. Jensen, Wantagh, N. Y., assignor to General Time Corporation, a corporation of Delaware Application February 16, 1952, Serial No. 271,923

5 Claims. (Cl. 318—220)

This invention relates to variable-speed alternating-current motor systems and, more particularly, to such systems of low-power rating suitable for embodiment in control systems and servo mechanisms.

It frequently becomes desirable to provide a motor control system, including a low-power or micro-power motor, with an adjustable speed over a wide range of speeds, for example, as much as 100:1. Also, it is desirable to effect such speed control by means of a relatively simple apparatus.

It is an object of the present invention, therefore, to provide a new and improved variable-speed alternating-current motor system adjustable over a wide range of speeds by means of a relatively simple control apparatus.

In accordance with the invention, there is provided a variable-speed alternating-current motor system comprising single-phase alternating-current supply circuit terminals, a phase-shifting reactance element, and an alternating-current motor having a plurality of phase windings, at least one of the motor windings being connected substantially directly to the supply terminals and at least another of the motor windings being connected to the supply terminals through the reactance element. The system also includes a linear resistance element connected directly in parallel with only the reactance element and adjustable to vary the relative phase of the currents in the motor windings, thereby to adjust the speed of the motor. The term "linear resistance element" is used herein and in the appended claims in its usual sense to refer to an element having a linear voltage-current characteristic; that is, an element the resistance of which does not vary with the magnitude or polarity of the applied potential so that the current therethrough varies linearly with variations in the applied potential. Such an element is to be contrasted with resistance elements having non-linear voltage-current characteristics, of which rectifiers and other asymmetrically conductive devices are the most common examples.

For a better understanding of the present invention, together with other and further objects thereof, reference is had to the following description taken in connection with the accompanying drawing, while its scope will be pointed out in the appended claims.

Figure 1:
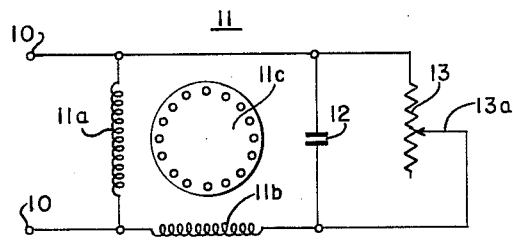
Figure 2:
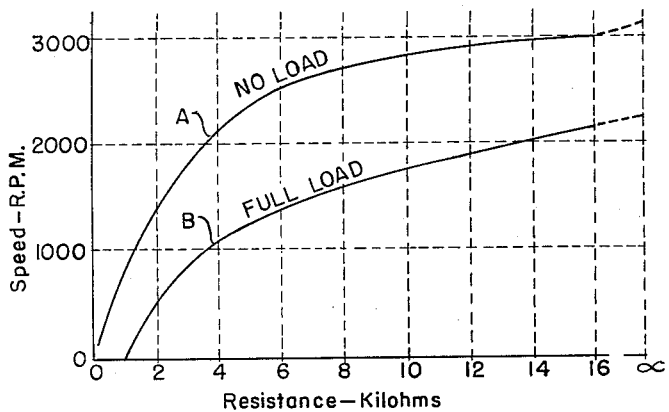
Figure 3:
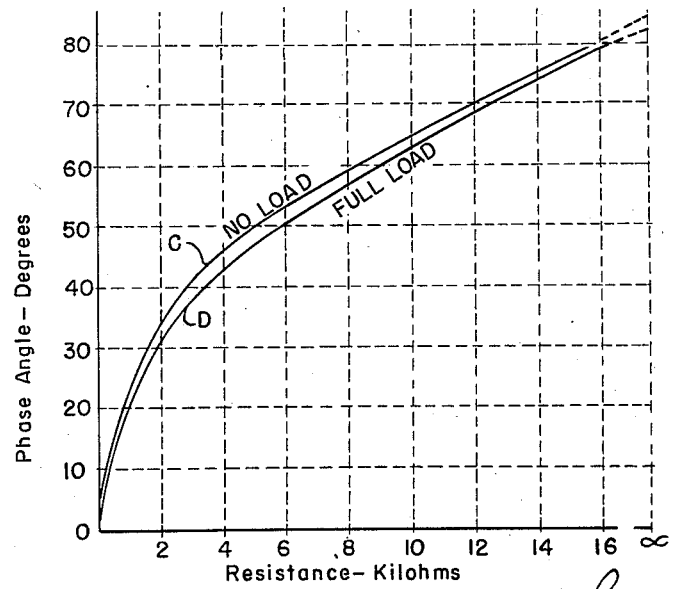

Referring now to the drawing, Fig. 1 is a schematic circuit diagram of a variable-speed alternating-current motor system embodying the invention; while Figs. 2 and 3 are graphs of certain operating characteristics of the system of Fig. 1.

Referring now to Fig. 1 of the drawing, there is represented a variable-speed alternating-current motor system embodying the invention and comprising a pair of single-phase alternating-current supply circuit terminals 10, 10 and an alternating-current motor, specifically an induction motor 11 including a pair of phase windings, one of such windings 11a being connected directly to the terminals 10, 10 and the other phase winding 11b being connected to the terminals 10, 10 through a phase-shifting reactance element such as a condenser 12. The motor 11 is also provided with a rotor 11c which is preferably a type of rotor having a high rotor resistance, such as a drag-cup rotor or, as illustrated, a conventional squirrel-cage rotor having a cage of high resistance.

The motor system of the invention also includes a linear resistance element, such as a resistor 13 connected in circuit with, specifically in parallel with, the reactance element or condenser 12. The resistor 13 is adjustable, as by means of an adjustable contact 13a, to vary the relative phase of the currents in the motor windings, thereby to adjust the speed of the motor. For a maximum range of speed control, the resistor 13 is adjustable between a lower value equal to a small fraction of the impedance of the condenser 12 at the operating frequency and an upper value of which said impedance is a small fraction.

In the operation of the variable-speed motor system described, it will be apparent that, if the contact 13a is adjusted to connect the maximum value of the resistor 13 in parallel with the condenser 12 so that the impedance of the two elements in parallel is primarily reactive, the currents in the phase windings 11a, 11b will be substantially in phase quadrature so that a uniform rotating field is developed thereby and a maximum power is developed by the rotor 11c. For any given load torque, the speed of the motor will be a maximum. As the adjustable contact 13a is adjusted to reduce the resistance value of the resistor 13, the phase of the impedance of the elements 12 and 13 in parallel is shifted, the phase of the current in the winding 11b is retarded, and the phase angle between the currents in the windings 11a, 11b is reduced so that the field developed by the motor windings may be considered as the sum of a uniform rotating field of reduced amplitude and a pulsating stationary field which produces no torque. Under these conditions the rotor 11c develops a reduced power output and for any given connected load torque, the speed of the motor is correspondingly reduced.

As the contact 13a is adjusted to reduce the value of the resistor 13 approximately to zero, thus substantially short-circuiting the condenser 12, the phase angle between the currents in the windings 11a, 11b is reduced substantially to zero, thereby reducing the power output developed by the rotor 11c substantially to zero so that it will run, if at all, only at no load.

There are represented in Figs. 2 and 3 the operating characteristics of the motor system illustrated in Fig. 1 having the following circuit constants:

Motor 11—Kollsman type 776—05 2-phase 115 volt, 60 cycle, drag up motor.
  Phase winding 11a—660 turns No. 38 wire; 1050 ohms.
  Phase winding 11b—740 turns No. 39 wire; 1600 ohms.
  Rotor 11c—copper drag cup.
  Rated load torque—approximately 0.1 ounce-inch.
Condenser 12—0.8 microfarad.
Resistor 13—Adjustable from 0 to 16 kilohms and disconnectable to provide infinite resistance.

Referring to Fig. 2, curve A represents the variation of speed of a motor system having the above constants with variations in the value of the resistor 13 from zero to 16 kilohms, the dotted-line portion of the curve representing the speed variation as the value of the resistance is increased to infinity. The lowest value of speed measured was 120 R. P. M., and the highest speed approximately 3100 R. P. M., or a range of speed variation of 25:1. The variation of speed with resistance at full load is represented by curve B, with respect to which measured speed varied from a few R. P. M. to 2350 R. P. M., or a speed ratio of several hundred to one.

In Fig. 3, curve C represents the variation in phase angle between the currents in the windings 11a, 11b as the value of the resistor 13 is varied from zero to infinity, the phase angle measurements varying from 5.8° to 84°, while in the same figure curve D represents the corresponding phase angle variation with full load on the motor. It is seen that the speed variations represented by curves A and B correspond generally with the phase angle variations represented by curves C and D, respectively, as the value of the resistor 13 is varied over its range.

While there has been described what is at present considered to be the preferred embodiment of the invention, it will be obvious to those skilled in the art that vari-

What is claimed is:

1. A variable-speed alternating-current motor system comprising: single-phase alternating-current supply circuit terminals; a phase-shifting reactance element; an alternating-current motor having a plurality of phase windings, at least one of said windings being connected substantially directly to said terminals and at least another of said windings being connected to said terminals through said reactance element; and a linear resistance element connected directly in parallel with only said reactance element and adjustable to vary the relative phase of the currents in said motor windings, thereby to adjust the speed of the motor.

2. A variable-speed alternating-current motor system comprising: single-phase alternating-current supply circuit terminals; a phase-shifting condenser; an alternating-current motor having a plurality of phase windings, at least one of said windings being connected substantially directly to said terminals and at least another of said windings being connected to said terminals through said condenser; and a linear resistance element connected directly in parallel with only said condenser and adjustable to vary the relative phases of the currents in said motor windings, thereby to adjust the speed of the motor.

3. A variable-speed alternating-current motor system comprising: single-phase alternating-current supply circuit terminals; a phase-shifting reactance element; an induction motor having a pair of phase windings, one of said windings being connected substantially directly to said terminals and another of said windings being connected to said terminals through said reactance element; and a linear resistance element connected directly in parallel with only said reactance element and adjustable to vary the relative phase of the currents in said motor windings, thereby to adjust the speed of the motor.

4. A variable-speed alternating-current motor system comprising: single-phase alternating-current supply circuit terminals; a phase-shifting reactance element; an alternating-current motor having a plurality of phase windings, at least one of said windings being connected substantially directly to said terminals and at least another of said windings being connected to said terminals through said reactance element; and a resistor connected directly in parallel with only said reactance element and adjustable to vary the relative phase of the currents in said motor windings, thereby to adjust the speed of the motor.

5. A variable-speed alternating-current motor system comprising: single-phase alternating-current supply circuit terminals; a phase-shifting reactance element; an alternating-current motor having a plurality of phase windings, at least one of said windings being connected substantially directly to said terminals and at least another of said windings being connected to said terminals through said reactance element; and a resistor connected in parallel with said reactance element and adjustable between a value equal to a small fraction of the impedance of said reactance element and a value of which said impedance is a small fraction to vary the relative phase of the currents in said motor windings, thereby to adjust the speed of the motor over a wide range.

References Cited in the file of this patent

UNITED STATES PATENTS

| Number | Name | Date |
|---|---|---|
| 603,778 | Stone et al. | May 10, 1898 |
| 1,147,168 | Gilson | July 20, 1915 |
| 1,894,804 | Weichsel | Jan. 17, 1933 |
| 1,896,855 | Thompson | Feb. 7, 1933 |
| 2,040,763 | Summers | May 12, 1936 |
| 2,091,665 | Weber | Aug. 31, 1937 |
| 2,095,281 | Owens | Oct. 12, 1937 |
| 2,406,193 | Carlson | Aug. 20, 1946 |
| 2,554,956 | Reeves | May 29, 1951 |